US009458708B2

(12) United States Patent
Wright et al.

(10) Patent No.: US 9,458,708 B2
(45) Date of Patent: Oct. 4, 2016

(54) RF COAXIAL TRANSMISSION LINE FOR A WELLBORE INCLUDING DUAL-WALL OUTER CONDUCTOR AND RELATED METHODS

(75) Inventors: Brian Wright, Indialantic, FL (US); Raymond Hewit, Palm Bay, FL (US); Keith Nugent, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 548 days.

(21) Appl. No.: 13/568,452

(22) Filed: Aug. 7, 2012

(65) Prior Publication Data
US 2014/0041890 A1    Feb. 13, 2014

(51) Int. Cl.
| | |
|---|---|
| H01B 13/20 | (2006.01) |
| H01B 7/00 | (2006.01) |
| H02G 15/22 | (2006.01) |
| E21B 43/24 | (2006.01) |
| E21B 17/18 | (2006.01) |
| H02G 9/06 | (2006.01) |

(52) U.S. Cl.
CPC ........... *E21B 43/2401* (2013.01); *E21B 17/18* (2013.01); *E21B 43/2408* (2013.01); *H02G 9/06* (2013.01); *Y10T 29/49123* (2015.01)

(58) Field of Classification Search
CPC ........... H01B 7/00; H01B 13/20; H02G 9/06
USPC ................ 174/82, 21 R, 21 SJ, 21 C, 47, 28
See application file for complete search history.

(56) References Cited

U.S. PATENT DOCUMENTS

| | | | |
|---|---|---|---|
| 5,575,331 A * | 11/1996 | Terrell | E21B 29/02 |
| | | | 166/212 |
| 6,707,307 B1 | 3/2004 | McFarlane et al. | |
| 7,441,597 B2 | 10/2008 | Kasevich | |
| 7,605,715 B2 | 10/2009 | Clark et al. | |
| 7,649,475 B2 | 1/2010 | Hall et al. | |
| 7,891,421 B2 | 2/2011 | Kasevich | |
| 2005/0103497 A1 | 5/2005 | Gondouin | |
| 2008/0251247 A1* | 10/2008 | Flint | E21B 17/028 |
| | | | 166/65.1 |
| 2010/0078163 A1 | 4/2010 | Banerjee et al. | |
| 2010/0294488 A1 | 11/2010 | Wheeler et al. | |
| 2010/0294489 A1 | 11/2010 | Dreher, Jr. et al. | |
| 2012/0098257 A1* | 4/2012 | Leslie | E21B 17/003 |
| | | | 285/336 |
| 2012/0325516 A1* | 12/2012 | Bonn | H01B 11/1856 |
| | | | 174/113 R |

* cited by examiner

*Primary Examiner* — Timothy Thompson
*Assistant Examiner* — Paul McGee, III
(74) *Attorney, Agent, or Firm* — Allen, Dyer, Doppelt, Milbrath & Gilchrist, P.A.

(57) ABSTRACT

A radio frequency (RF) coaxial transmission line to be positioned within a wellbore in a subterranean formation may include a series of coaxial sections coupled together in end-to-end relation. Each coaxial section may include an inner conductor, a dual-wall outer conductor surrounding the inner conductor, and a dielectric therebetween. Each of the dual-wall outer conductors may include an outer wall and an inner wall spaced apart therefrom defining a fluid passageway. Each coaxial section may further include a threaded endpiece coupled to each opposing end of the dual-wall outer conductor and having threads to define an overlapping mechanical threaded joint and an electrical joint with an adjacent threaded endpiece.

20 Claims, 6 Drawing Sheets

RF COAXIAL TRANSMISSION LINE FOR A WELLBORE INCLUDING DUAL-WALL OUTER CONDUCTOR AND RELATED METHODS

FIELD OF THE INVENTION

The present invention relates to the field of radio frequency (RF) equipment, and, more particularly, to an RF coaxial transmission line, such as, for hydrocarbon resource recovery using RF heating and related methods.

BACKGROUND OF THE INVENTION

Energy consumption worldwide is generally increasing, and conventional hydrocarbon resources are being consumed. In an attempt to meet demand, the exploitation of unconventional resources may be desired. For example, highly viscous hydrocarbon resources, such as heavy oils, may be trapped in sands where their viscous nature does not permit conventional oil well production. This category of hydrocarbon resource is generally referred to as oil sands. Estimates are that trillions of barrels of oil reserves may be found in such oil sand formations.

In some instances, these oil sand deposits are currently extracted via open-pit mining. Another approach for in situ extraction for deeper deposits is known as Steam-Assisted Gravity Drainage (SAGD). The heavy oil is immobile at reservoir temperatures, and therefore, the oil is typically heated to reduce its viscosity and mobilize the oil flow. In SAGD, pairs of injector and producer wells are formed to be laterally extending in the ground. Each pair of injector/producer wells includes a lower producer well and an upper injector well. The injector/production wells are typically located in the payzone of the subterranean formation between an underburden layer and an overburden layer.

The upper injector well is used to typically inject steam, and the lower producer well collects the heated crude oil or bitumen that flows out of the formation, along with any water from the condensation of injected steam. The injected steam forms a steam chamber that expands vertically and horizontally in the formation. The heat from the steam reduces the viscosity of the heavy crude oil or bitumen, which allows it to flow down into the lower producer well where it is collected and recovered. The steam and gases rise due to their lower density. Gases, such as methane, carbon dioxide, and hydrogen sulfide, for example, may tend to rise in the steam chamber and fill the void space left by the oil defining an insulating layer above the steam. Oil and water flow is by gravity driven drainage urged into the lower producer well.

Many countries in the world have large deposits of oil sands, including the United States, Russia, and various countries in the Middle East. Oil sands may represent as much as two-thirds of the world's total petroleum resource, with at least 1.7 trillion barrels in the Canadian Athabasca Oil Sands, for example. At the present time, only Canada has a large-scale commercial oil sands industry, though a small amount of oil from oil sands is also produced in Venezuela. Because of increasing oil sands production, Canada has become the largest single supplier of oil and products to the United States. Oil sands now are the source of almost half of Canada's oil production, while Venezuelan production has been declining in recent years. Oil is not yet produced from oil sands on a significant level in other countries.

U.S. Published Patent Application No. 2010/0078163 to Banerjee et al. discloses a hydrocarbon recovery process whereby three wells are provided: an uppermost well used to inject water, a middle well used to introduce microwaves into the reservoir, and a lowermost well for production. A microwave generator generates microwaves which are directed into a zone above the middle well through a series of waveguides. The frequency of the microwaves is at a frequency substantially equivalent to the resonant frequency of the water so that the water is heated.

Along these lines, U.S. Published Patent Application No. 2010/0294489 to Dreher, Jr. et al. discloses using microwaves to provide heating. An activator is injected below the surface and is heated by the microwaves, and the activator then heats the heavy oil in the production well. U.S. Published Patent Application No. 2010/0294488 to Wheeler et al. discloses a similar approach.

U.S. Pat. No. 7,441,597 to Kasevich discloses using a radio frequency generator to apply radio frequency (RF) energy to a horizontal portion of an RF well positioned above a horizontal portion of an oil/gas producing well. The viscosity of the oil is reduced as a result of the RF energy, which causes the oil to drain due to gravity. The oil is recovered through the oil/gas producing well.

U.S. Pat. No. 7,891,421, also to Kasevich, discloses a choke assembly coupled to an outer conductor of a coaxial cable in a horizontal portion of a well. The inner conductor of the coaxial cable is coupled to a contact ring. An insulator is between the choke assembly and the contact ring. The coaxial cable is coupled to an RF source to apply RF energy to the horizontal portion of the well.

Unfortunately, long production times, for example, due to a failed start-up, to extract oil using SAGD may lead to significant heat loss to the adjacent soil, excessive consumption of steam, and a high cost for recovery. Significant water resources are also typically used to recover oil using SAGD, which impacts the environment. Limited water resources may also limit oil recovery. SAGD is also not an available process in permafrost regions, for example, or in areas that may lack sufficient cap rock, are considered "thin" payzones, or payzones that have interstitial layers of shale.

In RF heating applications, a rigid coaxial feed arrangement or transmission line may be desired to couple to a transducer or an antenna in the subterranean formation. Typical commercial designs of a rigid coaxial feed arrangement are not generally designed for structural loading or subterranean use, as installation generally requires long runs of the transmission line along the lines of 500-1500 meters, for example.

Increased power or RF energy applied within the subterranean formation may result in transmission line and/or antenna component heating. One factor that may contribute to the increased heating may be the length of the coaxial feed, for example. Component heating for the antenna may be undesirable, and may result in less efficient hydrocarbon resource recovery, for example.

A typical coaxial feed geometry may not allow for adequate flow of a cooling fluid based upon a relatively large difference in hydraulic volume between inner and outer conductors of the coaxial feed. More particularly, a typical coaxial feed may be assembled by bolted flanges with compressed face seals, for example. The coaxial feed also includes a small inner conductor with a standoff for the signal voltage. However, the typical coaxial feed may not be developed for use of coolant and increased thermal performance. Moreover, hydraulic volumes of the inner and outer conductors may be significantly different, which may affect overall thermal performance.

U.S. Patent Application Publication No. 2005/0103497 to Gondouin discloses a down-hole flow control apparatus, super-insulated tubular, and surface tools for producing heavy oil by steam injection. More particularly, Gondouin discloses using two dedicated and super-insulated vertical tubulars, coaxially carrying wet steam at the center, surrounded by heated oil through the coldest part of their environment.

It may thus be desirable to provide increased cooling to a RF coaxial transmission line. More particularly, it may be desirable to provide a RF coaxial transmission line that includes a cooling mechanism so that conductive elements, for example, the coaxial elements, may be kept within linear conductive ranges.

SUMMARY OF THE INVENTION

In view of the foregoing background, it is therefore an object of the present invention to provide a coaxial transmission line that may include a cooling mechanism using less components and that provides increased heat removal.

This and other objects, features, and advantages in accordance with the present invention are provided by a radio frequency (RF) coaxial transmission line to be positioned within a wellbore in a subterranean formation for hydrocarbon resource recovery. The RF coaxial transmission line includes a series of coaxial sections coupled together in end-to-end relation. Each coaxial section includes an inner conductor, a dual-wall outer conductor surrounding the inner conductor, and a dielectric therebetween. Each of the dual-wall outer conductors includes an outer wall and an inner wall inwardly therefrom defining a fluid passageway. Each coaxial section further includes a threaded endpiece coupled to each opposing end of the dual-wall outer conductor and having threads to define an overlapping mechanical threaded joint and an electrical joint with an adjacent threaded endpiece. Accordingly, the RF coaxial transmission line provides increased heat removal by allowing coolant, for example, to be passed through the fluid passageways. For example, the use of a dual-wall outer conductor may be configured to match hydraulic volumes while maintaining a better dielectric stand-off between the inner and outer conductors.

A method aspect is directed to a method of making a radio frequency (RF) coaxial transmission line section to be positioned within a wellbore in a subterranean formation and to be coupled together in end-to-end relation with adjacent RF coaxial transmission line sections. The RF coaxial transmission line section includes an inner conductor, a dual-wall outer conductor surrounding the inner conductor, and a dielectric therebetween. The method includes providing the dual-wall outer conductor to include an outer wall and an inner wall spaced inwardly therefrom defining a fluid passageway. The method further includes coupling a threaded endpiece to each opposing end of the dual-wall outer conductor and having threads defining an overlapping mechanical threaded joint and an electrical joint with an adjacent threaded endpiece. The method further includes positioning the inner conductor within the dual-wall outer conductor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
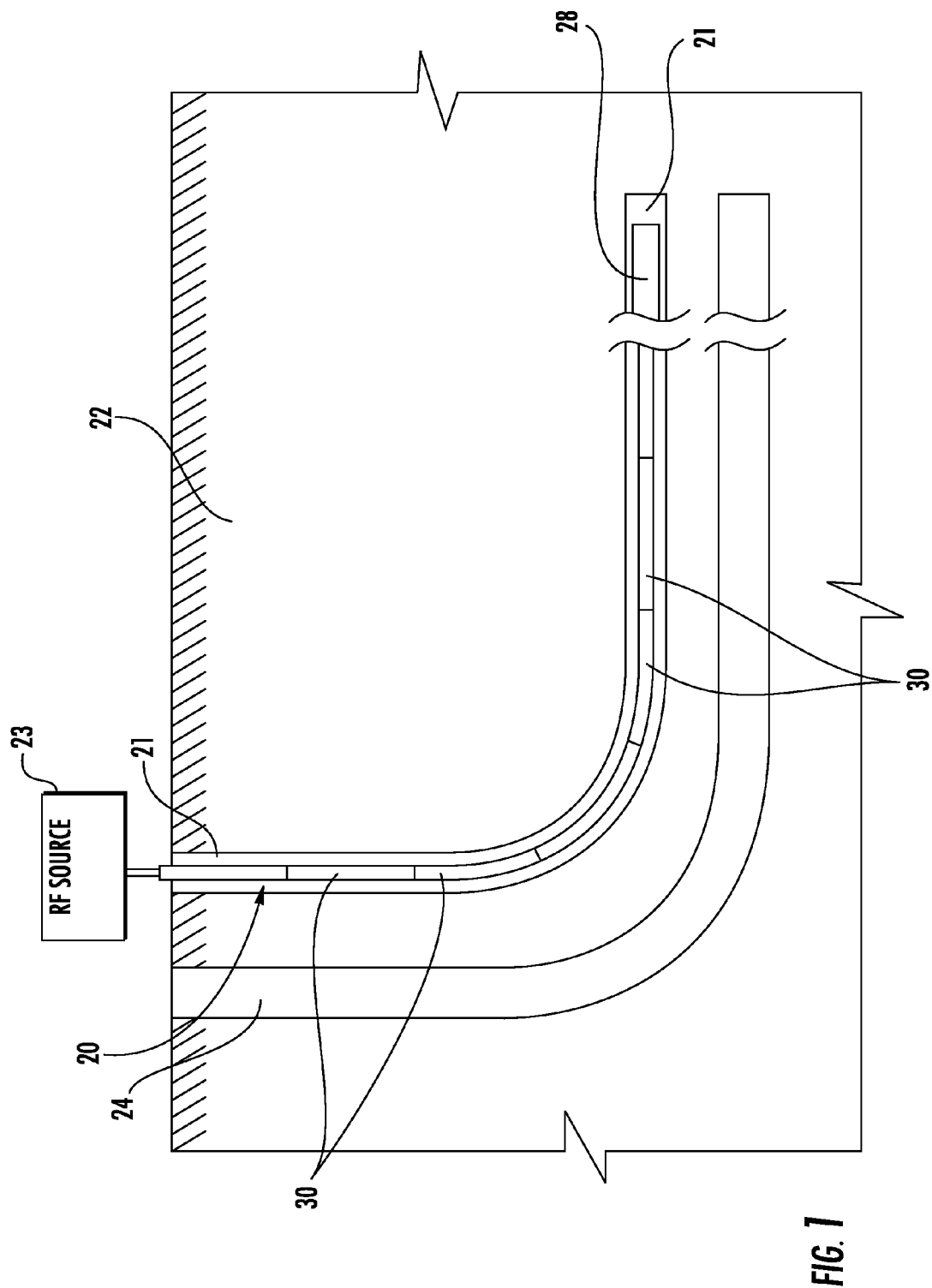
FIG. 1 is a schematic diagram of a subterranean formation including a RF coaxial transmission line in accordance with the present invention.

Referring initially to FIG. 1, a radio frequency (RF) coaxial transmission line 20 is positioned within a wellbore 21 in a subterranean formation 22. The subterranean formation 22 includes hydrocarbon resources. The wellbore 21 is illustratively in the form of a laterally extending wellbore, for example, as may be particularly advantageous for use RF assisted hydrocarbon resource recovery techniques. Of course, more than one wellbore and RF coaxial transmission line may be used, and/or other techniques for hydrocarbon resource recovery may be used, for example, the steam assisted gravity drainage (SAGD) hydrocarbon resource recovery technique. A separate producer well 24 could be positioned below the wellbore 21. The wellbore 21 could also be vertical in other embodiments.

The RF coaxial transmission line 20 is coupled to an RF source 23, which is positioned at the wellhead above the subterranean formation 22. The RF source 23 cooperates with the RF coaxial transmission line 20 to transmit RF energy from the RF source to the within the subterranean formation 22 adjacent the hydrocarbon resources, for example, for heating the subterranean formation. An antenna 28 or transducer is coupled to the RF coaxial transmission line within the wellbore 21. The RF coaxial transmission line 20 includes a series of coaxial sections 30, coupled together in end-to-end relation. Each coaxial section 30 may be rigid, for example.

Figure 2:
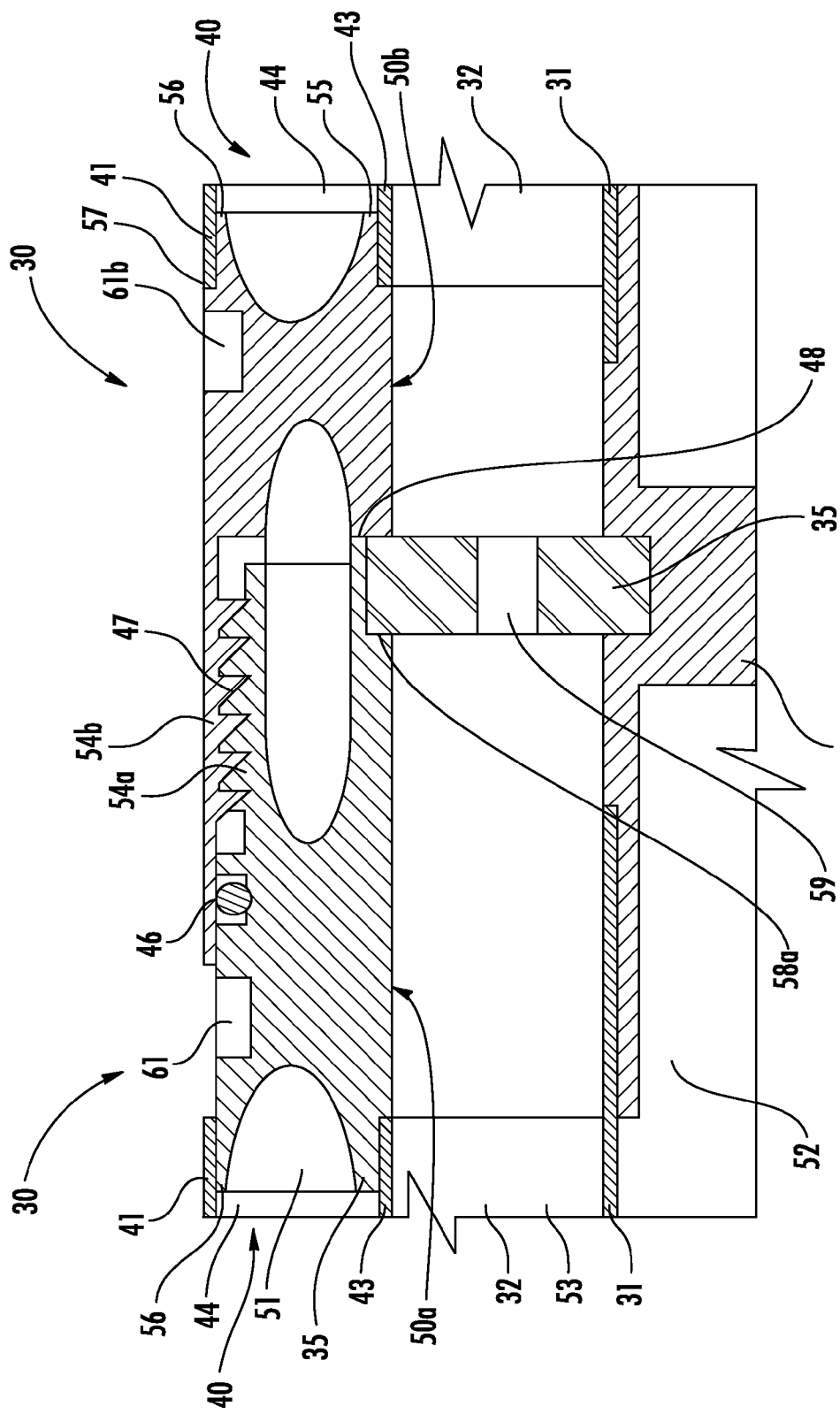
FIG. 2 is cross-sectional view of a portion of two RF coaxial transmission line sections of FIG. 1.
Figure 3A:
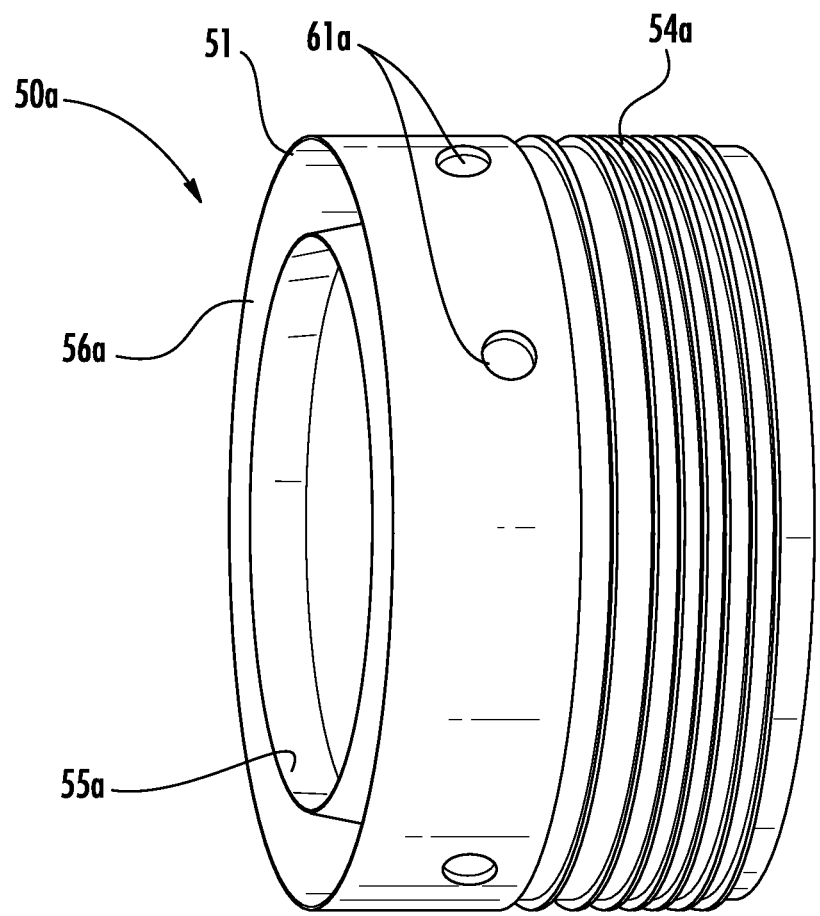
FIGS. 3a and 3b are perspective views of the threaded endpiece of FIG. 2.
Figure 3B:
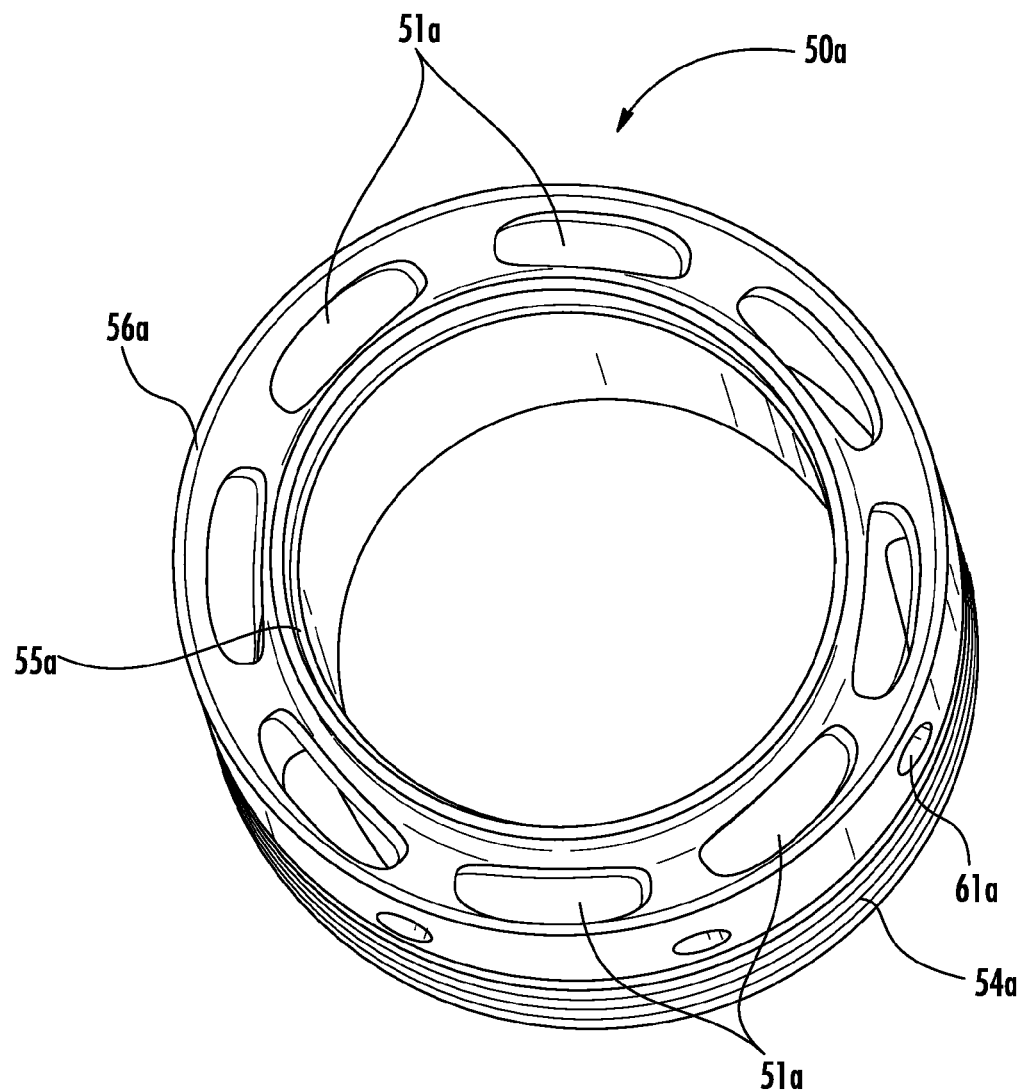
Figure 4A:
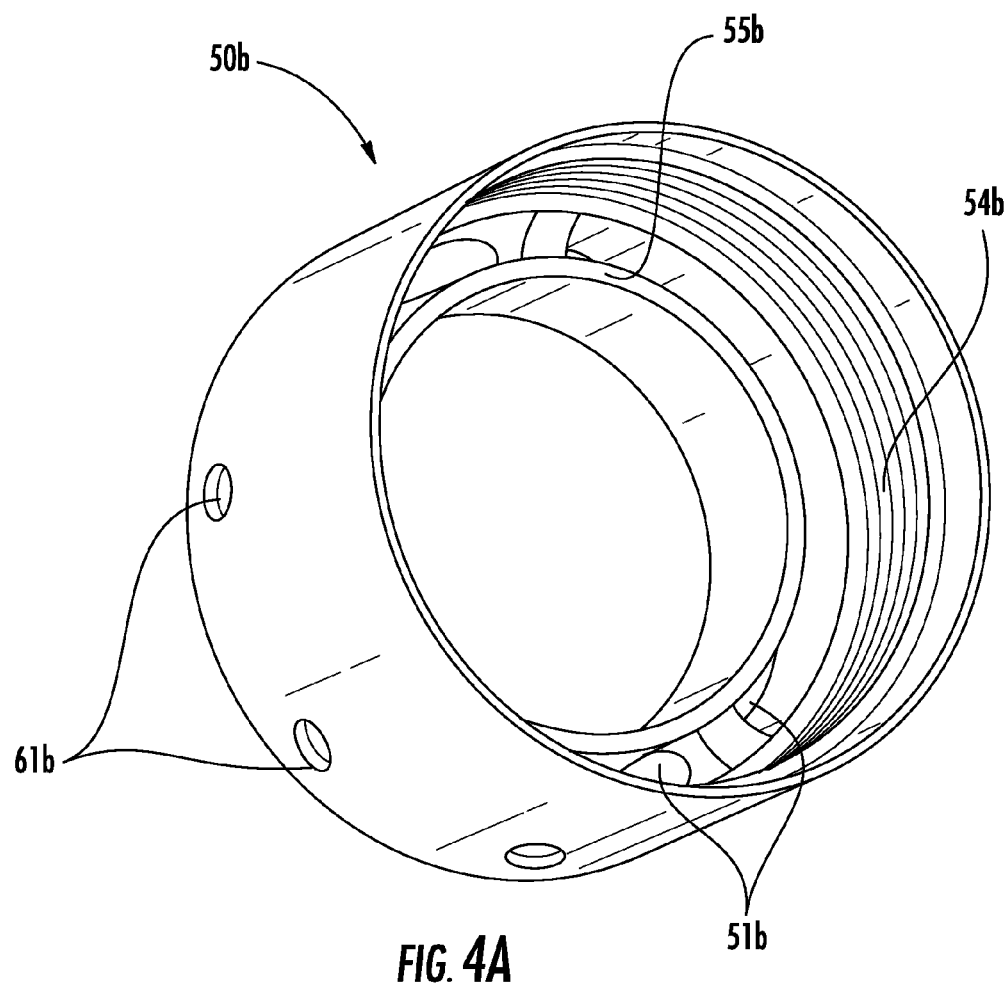
FIGS. 4a and 4b are perspective views of another threaded endpiece of FIG. 2.
Figure 4B:
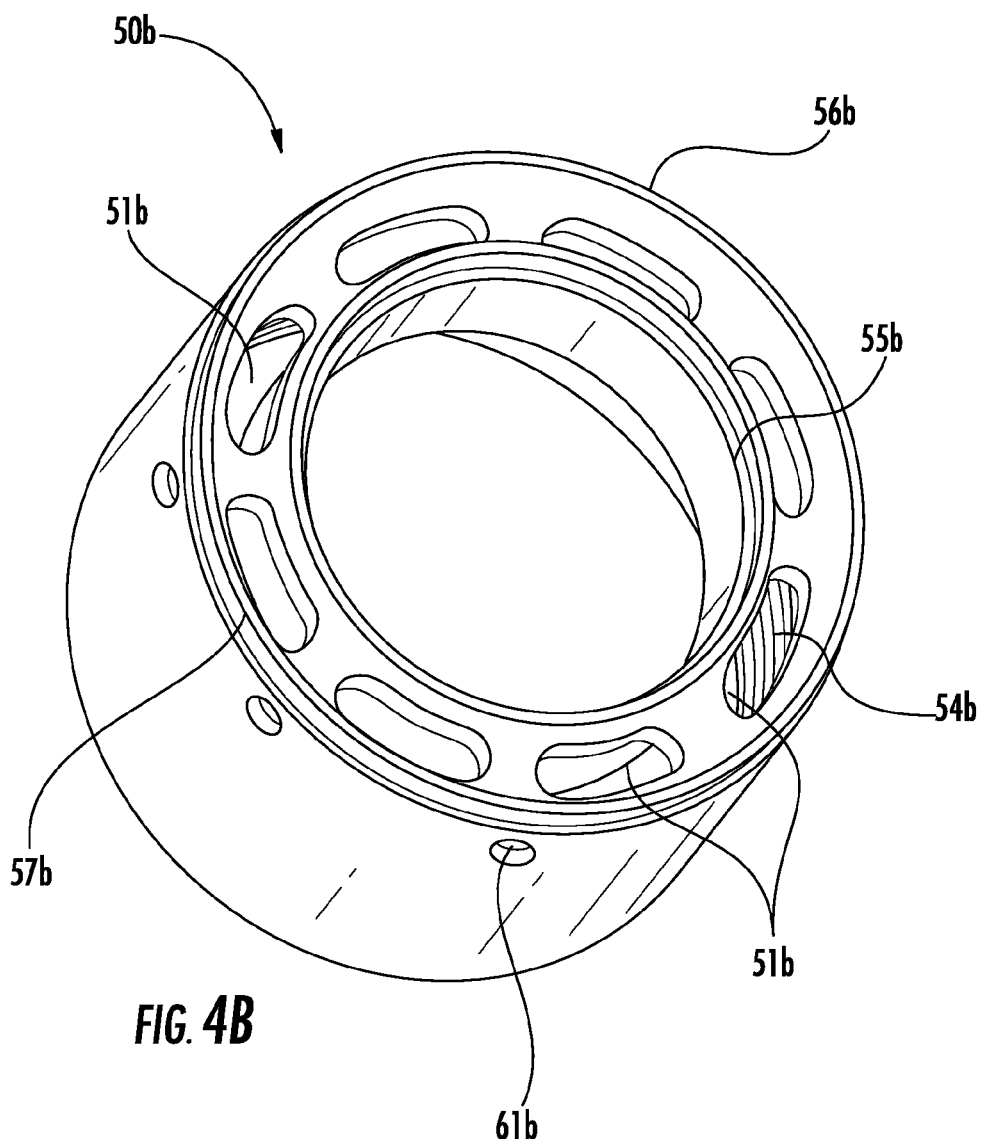

Referring now additionally to FIGS. 2-4, each coaxial section 30 includes an inner conductor 31, a dual-wall outer conductor 40 surrounding the inner conductor 31, and a dielectric 32 therebetween. The dielectric 32 may be a cooling fluid or gas for the coaxial section 30, for example, mineral oil. The cooling fluid may be DI water, or florinert, and the cooling gas may be pressurized N2 or SF6, or a mixture. Each of the dual-wall outer conductors 40 includes an outer wall 41.

Each dual-wall outer conductor 40 also includes an inner wall 43 spaced inwardly from the outer wall 41 to define a fluid passageway 44. Air, a solvent, and/or steam may be passed through the fluid passageway 44.

Each coaxial section 30 also includes a pair of threaded endpieces 50a, 50b coupling the outer and inner walls 41, 43 together at ends thereof and each defining an overlapping mechanically threaded joint 47 with each other or an adjacent threaded endpiece. In other words, the threaded endpieces 50a, 50b couple to the ends of the inner and outer walls 43, 41 and extend outwardly therefrom so that opposing threaded ends define an overlapping mechanical threaded joint 47 with a threaded endpiece of an adjacent coaxial section 30. In some embodiments, a gasket 46 or O-ring, for example, may be positioned in or adjacent the threaded joint for an increased seal. Additionally, the threaded endpieces 50a, 50b may each have a tool recess 61 therein for engaging a tool, for example during installation.

One threaded endpiece 50a is in the form of a male threaded endpiece and has threads 54a on the outside thereof. Another threaded endpiece 50b is in the form of a female threaded endpiece and has threads 54b on an interior thereof for receiving the male threads 54a from the male threaded endpiece 50a, and together they define the overlapping mechanically threaded joint 47. Each threaded endpiece 50a, 50b also includes a threaded endpiece inner wall coupling portion 55 and a threaded endpiece outer wall coupling portion 56 for coupling to the inner wall 43 and the outer wall 41, respectively.

As noted above, each threaded endpiece 50a, 50b may be coupled to the ends of inner and outer walls 43, 41 of the dual-wall outer conductor 40. The factory pipe or COTS tubular or wellpipe may come from the manufacturer without threaded ends so that each threaded endpiece 50 may be slid partially within and welded to the outer wall 41. By sliding within and coupling to the outer wall 41, the threaded endpieces, when coupled, define a radially flush mechanically threaded joint 47 with adjacent portions of the dual-wall outer conductor 40. The female threaded end 50b may have a recess 57b in an outer surface defining a shoulder or stop where the outer wall 41 is radially flush with the female threaded endpiece.

The male threaded endpiece 50a does not include the recess, and thus, when the threaded endpieces 50 are mechanically coupled via the overlapping threaded mechanical joints 47, the threaded endpieces are radially flush with the outer wall 41. In other words, the male threaded endpiece 50a has a slightly smaller outer diameter than the female threaded endpiece 50b. Since the male threaded endpiece 50a does not have a recess for the outer wall, it may be spaced from an outer surface of the outer wall 41 by the thickness of the outer wall. This spacing is small enough so that the male threaded end 50a is still considered by those skilled in the art as radially flush with the adjacent portions of the dual-wall outer conductor 40.

Each threaded endpiece 50a, 50b also has a distal end that defines an electrical joint 48 with the outer threaded endpiece or with a distal end of an adjacent threaded endpiece. More particularly, the electrical joint 48 may be defined by the mating of the ends of the male and female threaded endpieces 50a, 50b. Thus, the electrical joint 48 is an electrically conductive compression joint, making electrical contact when adjacent threaded endpieces are mated.

Each threaded endpiece 50 also has fluid passageways therein 51 that are aligned with the fluid passageway 44 to allow fluid to flow therethrough and to define a single fluid passageway between the inner and outer walls 43, 41. Air, a solvent, and/or steam may be passed through the fluid passageways 44, 51 to process or increase the efficiency of hydrocarbon resource recovery. RF components that may be positioned within the wellbore 21 may also be controlled via the fluid passageways 44, 51, for example, for RF power adjustment and control of impedance matching units.

Each coaxial section 30 further includes a dielectric spacer 35 carried at an end of the threaded endpiece 50a and adjacent the electrical joint 48. The dielectric spacer 35 has a bore therethrough. Each coaxial section 30 also includes an inner conductor coupler 37 carried by the bore of the dielectric spacer 35 and that electrically couples adjacent ends of the inner conductor 31.

Each male threaded endpiece 50a has a recess 58a at an end thereof receiving the dielectric spacer 35. The recess 58a may define a shoulder, for example.

The inner conductor 31 is a tubular inner conductor and defines another fluid passageway 52 therethrough. Similar to the fluid passageways 44, 51, the fluid passageway 52 defined by the tubular inner conductor 31 may allow the passage of a cooling fluid for maintaining each coaxial section 30 at a desired operating temperature, or control of RF components. Of course in some embodiments the fluid passageway 52 may allow the passage of air, a solvent, and/or steam.

The dual-wall outer conductor 40 and the inner conductor 31 are spaced apart defining yet another fluid passageway 53. More particularly, the dielectric spacer 35 may have one or more openings 59 therein to define the fluid passageway 53. Similar to the other fluid passageways, the fluid passageway 53 defined by the spaced part dual-wall outer conductor 40 and the inner conductor 31 may allow the passage of air, a cooling gas, a cooling fluid, or control of RF components. In some embodiments, the fluid passageway 53 may allow the passage of a solvent, and/or steam.

The multiple walls, i.e., the dual-wall outer conductor 40 and tubular inner conductor 31 of each coaxial section 30 along with the threaded endpieces 50a, 50b provide increased matching of hydraulic volumes and facilitate increased fluid flow, for example, coolant flow. More particularly, hydraulic diameters may be matched relatively closely, that is, the ratio of the area/wetted perimeter. By matching the hydraulic diameters, approximately equal flow may be applied to different cross sections. Conversely, different diameters may allow increased cooling by selecting diameters to provide turbulent flow (fast flow) on the path downward (cooling the inner conductor 31), but slower laminar (slow) flow on the return path, to transfer heat to the elements outside of the coaxial section 30, which may thereby passively heat the solvent flowing downward, before injection into the reservoir.

Advantageously, coolant, for example, may be circulated at more optimum conditions, and larger fluid flows through the fluid passageways may remove excess heat while maintaining a better dielectric stand-off between the dual-wall outer conductor 40 and the inner conductor 31. The RF coaxial transmission line 20 is advantageously cooled by the fluid flow through the fluid passageway 44, 51, and/or other fluid passageways 52, 53 which may maintain the conductive elements or the antenna 28 within its linear conductive range. The heated reservoir, adjacent the antenna in the subterranean formation 22 acts as an "oven," wherein active cooling of the RF coaxial transmission line 20 may be desired. The dual-wall outer conductors 40 with the fluid passageway 44, 51 defined therein advantageously may provide this cooling.

A method aspect is directed to a method of making a radio frequency (RF) coaxial transmission line section 30 to be positioned within a wellbore 21 in a subterranean formation 22 and to be coupled together in end-to-end relation with adjacent RF coaxial transmission line sections. The RF coaxial transmission line section 30 includes an inner conductor 31, a dual-wall outer conductor 40 surrounding the inner conductor, and a dielectric 32 therebetween. The method includes providing the dual-wall outer conductor 40 to include an outer wall 41 and an inner wall 43 spaced inwardly therefrom defining a fluid passageway 44, 51.

The method further includes coupling a threaded endpiece 50 to each opposing end of the dual-wall outer conductor 40. The threaded endpiece 50 has threads 54 defining an overlapping mechanical threaded joint 47 and an electrical joint 48 with an adjacent threaded endpiece. The method further includes positioning the inner conductor 31 within the dual-wall outer conductor 40.

Many modifications and other embodiments of the invention will also come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) coaxial transmission line suitable to be positioned within a wellbore in a subterranean formation for hydrocarbon resource recovery, the RF coaxial transmission line comprising:
    a series of coaxial sections coupled together in end-to-end relation, each coaxial section comprising an inner conductor, a dual-wall outer conductor surrounding said inner conductor, and a dielectric therebetween;
    each of said dual-wall outer conductors comprising an outer wall and an inner wall spaced inwardly therefrom defining a fluid passageway;
    each coaxial section further comprising a threaded endpiece coupled to each opposing end of said dual-wall outer conductor and having threads to define an overlapping mechanical threaded joint and an electrical joint with an adjacent threaded endpiece.

2. The RF coaxial transmission line according to claim 1, wherein said threaded endpiece is configured to define a radially flush overlapping mechanical threaded joint relative to adjacent portions of said dual-wall outer conductor.

3. The RF coaxial transmission line according to claim 1, wherein said threaded endpiece has a plurality of fluid passageways therein.

4. The RF coaxial transmission line according to claim 1, wherein the electrical joint comprises an electrically conductive compression joint.

5. The RF coaxial transmission line according to claim 1, wherein each coaxial section further comprises:
    a dielectric spacer carried at an end of said threaded endpiece and having a bore therethrough; and
    an inner conductor coupler carried by the bore of said dielectric spacer and configured to electrically couple ends of adjacent inner conductors.

6. The RF coaxial transmission line according to claim 5, wherein said threaded endpiece has a recess at an end thereof receiving said dielectric spacer.

7. The RF coaxial transmission line according to claim 5, wherein the electrical joint is adjacent said dielectric spacer.

8. The RF coaxial transmission line according to claim 1, wherein said inner conductor comprises a tubular inner conductor defining a second fluid passageway therethrough.

9. The RF coaxial transmission line according to claim 1, wherein said outer and inner conductors are spaced apart defining a second fluid passageway.

10. A radio frequency (RF) coaxial transmission line section suitable to be positioned within a wellbore in a subterranean formation for hydrocarbon resource recovery and to be coupled together in end-to-end relation with adjacent RF coaxial transmission line sections, the RF coaxial transmission line section comprising:
    an inner conductor;
    a dual-wall outer conductor surrounding said inner conductor;
    a dielectric between said inner conductor and said dual-wall outer conductor;
    said dual-wall outer conductor comprising an outer wall and an inner wall spaced inwardly therefrom to define a fluid passageway; and
    a threaded endpiece coupled to each opposing end of said dual-wall outer conductor and having threads to define an overlapping mechanical threaded joint and an electrical joint with an adjacent threaded endpiece.

11. The RF coaxial transmission line section according to claim 10, wherein said threaded endpiece is configured to define a radially flush overlapping mechanical threaded joint relative to adjacent portions of said dual-wall outer conductor.

12. The RF coaxial transmission line section according to claim 10, wherein said threaded endpiece has a plurality of fluid passageways therein.

13. The RF coaxial transmission line section according to claim 10, wherein the electrical joint comprises an electrically conductive compression joint.

14. The RF coaxial transmission line section according to claim 10, further comprising:
    a dielectric spacer carried at an end of said threaded endpiece and having a bore therethrough; and
    an inner conductor coupler carried by the bore of said dielectric spacer and configured to electrically couple ends of adjacent inner conductors.

15. The RF coaxial transmission line section according to claim 10, wherein said inner conductor comprises a tubular inner conductor defining another fluid passageway therethrough.

16. The RF coaxial transmission line section according to claim 10, wherein said outer and inner conductors are spaced apart defining another fluid passageway.

17. A method of making a radio frequency (RF) coaxial transmission line section to be coupled together in end-to-end relation with adjacent RF coaxial transmission line sections, the RF coaxial transmission line section comprising an inner conductor, a dual-wall outer conductor surrounding the inner conductor, and a dielectric therebetween, the method comprising:
    providing the dual-wall outer conductor to comprise an outer wall and an inner wall spaced inwardly therefrom defining a fluid passageway;
    coupling a threaded endpiece to each opposing end of the dual-wall outer conductor and having threads to define an overlapping mechanical threaded joint and an electrical joint with an adjacent threaded endpiece; and
    positioning the inner conductor within the dual-wall outer conductor.

18. The method according to claim 17, wherein coupling the threaded endpiece comprises coupling the threaded endpiece to define a radially flush overlapping mechanical threaded joint relative to adjacent portions of the dual-wall outer conductor.

19. The method according to claim 17, wherein coupling the threaded endpiece comprises coupling a threaded endpiece having a plurality of fluid passageways therein.

20. The method according to claim 17, wherein coupling the threaded endpiece comprises coupling the threaded endpiece to define an electrically conductive compression joint with an adjacent threaded endpiece.

* * * * *